(12) United States Patent
Koehne et al.

(10) Patent No.: US 11,875,913 B2
(45) Date of Patent: Jan. 16, 2024

(54) ELECTRICAL CONDUCTOR MADE OF GRAPHENE AND/OR CARBON NANOTUBES HAVING COATED JOINTS

(71) Applicant: Robert Bosch GmbH, Stuttgart (DE)

(72) Inventors: Martin Koehne, Asperg (DE); Felix Stewing, Steinheim (DE); Raimund Bohl, Heimsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/783,681

(22) PCT Filed: Oct. 19, 2020

(86) PCT No.: PCT/EP2020/079322
§ 371 (c)(1),
(2) Date: Jun. 9, 2022

(87) PCT Pub. No.: WO2021/115669
PCT Pub. Date: Jun. 17, 2021

(65) Prior Publication Data
US 2023/0005639 A1    Jan. 5, 2023

(30) Foreign Application Priority Data
Dec. 9, 2019  (DE) ...................... 10 2019 219 184.3

(51) Int. Cl.
*H01B 1/04* (2006.01)
*B32B 7/025* (2019.01)
*H01B 5/00* (2006.01)

(52) U.S. Cl.
CPC ............... *H01B 1/04* (2013.01); *B32B 7/025* (2019.01); *H01B 5/00* (2013.01)

(58) Field of Classification Search
CPC . B32B 7/025; H01B 1/04; H01B 5/00; H02K 3/02; B82Y 10/00; B82Y 40/00;
(Continued)

(56) References Cited

U.S. PATENT DOCUMENTS 6,498,098 B1 * 12/2002 Abe .................. H01L 21/76856
257/E21.585
8,999,212 B2  4/2015 Koenders et al.
(Continued)

FOREIGN PATENT DOCUMENTS

CN        2535973 Y   *  2/2003  ................ H02P 6/08
CN    102354668 A   *  2/2012  ............. B82Y 40/00
(Continued)

OTHER PUBLICATIONS

Hafnium Oxide_Stanford Materials_p. 1_Jan. 2019.*
(Continued)

*Primary Examiner* — Timothy J Thompson
*Assistant Examiner* — Guillermo J Egoavil
(74) *Attorney, Agent, or Firm* — Michael Best & Friedrich LLP

(57) ABSTRACT

The present invention relates to an electrical conductor (1) having an electrically conductive material (2) comprising graphene and/or carbon nanotubes and a joint (3, 4), wherein a metal coating (6) is provided on the electrically conductive material (2) of the electrical conductor (1) at the joint (3, 4) for integrally joining the electrical conductor (1) to a metal conductor element, the metal coating (6) being in direct contact with the electrically conductive material (2), characterized in that the metal coating (6) of the joint (3, 4) comprises a metal that forms carbides in a boundary layer of the coating (6) by reaction of the metal of the coating (6) with the carbon of the electrically conductive material (2).

14 Claims, 2 Drawing Sheets

(58) Field of Classification Search
CPC ........... H01L 21/336; Y10T 428/24851; Y10T 428/24917; Y10T 428/25; Y10T 428/30
USPC ............... 174/84 R; 428/201, 209, 323, 408; 977/734, 750, 752, 762, 773, 890
See application file for complete search history.

(56) References Cited

U.S. PATENT DOCUMENTS

| | | | |
|---|---|---|---|
| 8,999,385 B2 | 4/2015 | Petereit et al. | |
| 2005/0244644 A1* | 11/2005 | Hampden-Smith | H01B 1/122 428/408 |
| 2012/0107597 A1* | 5/2012 | Kim | B82Y 30/00 252/502 |
| 2013/0059134 A1* | 3/2013 | Chai | B82Y 10/00 977/734 |
| 2014/0246734 A1* | 9/2014 | Kim | H01L 29/4966 257/410 |
| 2015/0059134 A1 | 3/2015 | Yang et al. | |
| 2018/0347033 A1* | 12/2018 | Yoon | C23C 14/34 |

FOREIGN PATENT DOCUMENTS

| | | |
|---|---|---|
| CN | 105544016 A | 5/2016 |
| CN | 105544017 A | 5/2016 |
| CN | 105603581 A | 5/2016 |
| CN | 107221387 A | 9/2017 |
| CN | 108892134 A | 11/2018 |
| DE | 102018200236 A1 | 7/2019 |
| WO | 2007015710 A2 | 2/2007 |
| WO | 2013034672 A2 | 3/2013 |
| WO | 2013051761 A1 | 4/2013 |
| WO | 2015004467 A2 | 1/2015 |
| WO | 2018158003 A1 | 9/2018 |
| WO | 2018177767 A1 | 10/2018 |
| WO | 2018233897 A1 | 12/2018 |

OTHER PUBLICATIONS

Translation of International Search Report for Application No. PCT/EP2020/079322 dated Feb. 18, 2021 (3 pages).

DiLeo et al., "Enhanced Capacity and Rate Capability of Carbon Nanotube Based Anodes with Titanium Contacts for Lithium Ion Batteries", ACS Nano, 2010, vol. 4, No. 10, pp. 6121-6131.

Vitale et al., "Metal-Carbon Nanotube Contacts: The Link between Schottky Barrier and Chemical Bonding", JACS Communications, 2008, vol. 130, pp. 5848-5849.

* cited by examiner

ELECTRICAL CONDUCTOR MADE OF GRAPHENE AND/OR CARBON NANOTUBES HAVING COATED JOINTS

BACKGROUND OF THE INVENTION

The present invention relates to an electrical conductor. The electrical conductor comprises an electrically conductive material composed of graphene and/or carbon nanotubes, with end regions being coated for improved contacting. The invention also relates to a production method for producing such electrical conductors.

Alternative electrical conductor materials are based on carbon nanotubes and/or graphene platelets. The electrical conductivity of carbon nanotubes and graphene platelets exceeds the conductivity of copper. These alternative electrical conductor materials are notable not only for their low density of around 2 $g/cm^3$ (whereas copper has a density of 8.95 $g/cm^3$) but also for their flexural slackness, which allows these conductor materials to change their cross section in accordance with the action of external forces. Accordingly, in a packing consisting of numerous individual conductors, the packing density can be increased through application of force such that there are hardly any voids remaining. This is not possible for copper conductors, owing to their radial stiffness.

Graphene films or carbon nanotube films are produced according to the prior art as conductor material by a variety of techniques. WO 2007/015710 A2 shows the production of CNT tapes from so-called CNT forests. The tapes are electrically conductive and notable for high elongation at break and high tensile strength. An alternative production method for CNT tapes is described in U.S. Pat. No. 8,999,285B2. Production here is accomplished through synthesis of a CNT aerogel. On exit from the reactor, this gel is processed to a tape. Another production method for tapes based on carbon nanotubes is disclosed in WO 2013/034672. In this case the carbon nanotubes are dispersed in a superacid and then processed by wet spinning into fibers or else into tapes.

For production variants of commercial interest, the raw material used is exclusively graphite. In CN108892134A, graphite powder is subjected to wet-chemical intercalation by means of the so-called Hummers method and is oxidized to graphene oxide. The purified graphene oxide dispersion is then processed to a film, and is subsequently reduced by heat treatment to give a graphene film. In CN107221387A the graphene film is produced directly from an aqueous dispersion. DE102018200236A1 shows that doping with metals may take place during the actual production of the graphene oxide dispersion. Following the application of the graphene film to a substrate, and drying, the dispersant, which as a surface-active substance made the aqueous dispersion possible, is removed in a further step.

The production of fibers from graphene is disclosed in U.S. Pat. No. 8,999,212 B2. In this case graphene is obtained by one-sided axial separation of carbon nanotubes. The graphene is thereafter dispersed in a superacid and subsequently processed to fibers by wet spinning. Of particular preference for the production of graphene fibers is their production from graphene oxide, which is produced from graphite by wet-chemical oxidation such as the Hummers method, for example. Because this production pathway uses graphite as raw material, the raw materials costs are lower by one or two orders of magnitude in comparison to the method stated above. Production methods of these kinds are disclosed in CN105603581A, CN105544016A and CN105544017A. At the end of the production process, a thermal treatment at temperatures of up to 3000° C. is necessary for increasing the electrical conductivity.

Graphene-based conductors such as films, fibers and yarns, for example, may be isolated as in WO18177767A1 by fluorination of the marginal layer, which in the process is transformed into an insulator and which thereby provides electrical shielding of the film. A further possibility, moreover, is that of electrical insulation through polymer application, as set out in WO13051761A1.

Electrical conductors of these kinds are used in electrical motors as set out in WO18233897 A1 or WO18158003 A1. The soldering of carbon-based conductor materials with specially modified solders is in WO 2015004467 A2. The addition of 1-10 mass % of transition metals achieves positive results in relation to CNT yarns.

SUMMARY OF THE INVENTION

The electrical conductor of the invention, based on graphene and/or carbon nanotubes, enables the joints for contacting that are produced to be modified in such a way that they can be soldered using standard metal solders.

The electrical conductor of the invention comprises an electrically conductive material. The electrically conductive material comprises graphene and/or carbon nanotubes. The electrical conductor further comprises a joint. With preference the electrical conductor may comprise an electrical insulation at an outer periphery of the electrically conductive material. At the joint a metallic coating is provided which is configured for cohesive connection of the electrical conductor to a metallic conductor element and is in direct contact with the electrically conductive material. This simplifies electrical contacting of the electrical conductor. More particularly it is possible to use standard solders in order to solder the electrical conductor at the coating to metallic conductor elements. The metallic coating of the joint comprises a metal which forms carbides in a boundary layer of the coating through reaction of the metal of the coating with the carbon of the electrically conductive material. These carbides come about in particular through reaction of the metals used with the carbon of the electrical conductor during the coating operation. As a result of the carbides, there is in particular only a small increase in the contact resistance and hence high electrical conductivity, with at the same time a connection being formed, more particularly a cohesive connection. This therefore makes it possible for the joint to be soldered with customary, standard solders in order to produce electrical contacts to other components.

The metallic coating comprises preferably titanium and/or zirconium and/or iron and/or vanadium and/or niobium and/or molybdenum and/or hafnium and/or tantalum and/or tungsten. These materials are suitable for coating the electrical conductor. More particularly these materials enable formation of above-described carbides, and so the coating has a low electrical resistance.

The coating is preferably a plasma coating. This enables a simple and inexpensive application of the coating on the one hand, and also a reliable and low-resistance electrical contacting of the electrical conductor on the other.

In the boundary layer of the coating there are preferably nitrides formed as well. These nitrides ensure a reduction in the electrical contact resistance between coating and electrically conductive material. This therefore enables optimal electrical contacting of the electrical conductor by means of the coating.

The invention relates additionally to an electrical machine. This machine has a coil winding which is formed of an electrical conductor as described above. The coil winding is more particularly a winding of a rotor or stator of the electrical machine. The use of the electrically conductive material comprising graphene and/or carbon nanotubes enables flexurally slack, textile qualities in the electrical conductor. This is advantageous for the formation of an electrical winding on rotor or stator. The metallic coating enables optimal electrical contacting of the coil.

The invention further relates to a method for producing an electrical conductor. For this purpose the following steps are performed: first an electrically conductive material comprising graphene and/or carbon nanotubes is provided. A material of this kind generally is unsolderable or difficult to solder and therefore has poor electrical connectivity to other components, more particularly other electrical conductor elements. Therefore there is a step of forming a joint of the electrical conductor by coating of a predefined subregion of the electrically conductive material with a metallic coating. The metallic coating enables simple and low-resistance electrical connection of the conductor. More particularly it is possible to produce a soldered connection by means of simple standard solders. The metallic coating comprises a metal which on contact with the electrical conductor, more particularly at elevated temperature, forms carbides at least partially in a boundary layer of the metallic coating. These carbides come about more particularly through reaction of the metals used with the carbon of the electrical conductor during the coating operation. The carbides mean that there is, in particular, only a small increase in the contact resistance and therefore a high electrical conductivity of the connection point, while at the same time a connection, more particularly a cohesive connection, is formed. This therefore enables the joint to be soldered with customary, standard solders in order to produce electrical contacts to other components.

The coating takes place preferably with titanium and/or zirconium and/or iron and/or vanadium and/or niobium and/or molybdenum and/or hafnium and/or tantalum and/or tungsten. These materials are suitable for coating the electrical conductor. More particularly these materials enable formation of above-described carbides, and so the coating has a low electrical resistance.

The coating operation advantageously utilizes a thermal spraying process. Such processes are, in particular, arc spraying, conventional and high-velocity flame spraying, cold gas spraying, plasma spraying, and laser beam spraying. Of these processes, coating by means of plasma spraying is particularly preferred. Accordingly a simple and inexpensive application of the coating on the one hand and a reliable and low-resistance electrical contacting of the electrical conductor on the other are made possible.

With particular advantage nitrogen is added to an inert gas used for the plasma spraying. This enables the formation of nitrides in the metallic coating. As a result, the formation of carbides can be suppressed. This is advantageous if the carbides have a lower electrical conductivity than the nitrides, since in this case the metallic coating can be boosted in its electrical conductivity. With particular advantage the corresponding nitrides have a higher electrical conductivity than the corresponding carbides of the same metals. The addition of hydrogen is carried out preferably when titanium and/or zirconium and/or hafnium are used as metals for the coating.

With particular advantage the nitrogen is added only at the start of the plasma spraying, and so the addition is made only for that part of the coating which comes into contact with the electrical conductor. After a predefined period has expired, the inert gas is no longer added. The effect of this is that the nitrides are formed only in the boundary layer of the coating, in which the coating has direct contact with the electrically conductive material and in which the carbides are formed. More particularly, therefore, nitrides are formed only where they are needed in order to reduce the electrical resistance.

BRIEF DESCRIPTION OF THE DRAWING

Exemplary embodiments of the invention are described in detail below with reference to the accompanying drawing. In the drawing.

DETAILED DESCRIPTION

Figure 1:
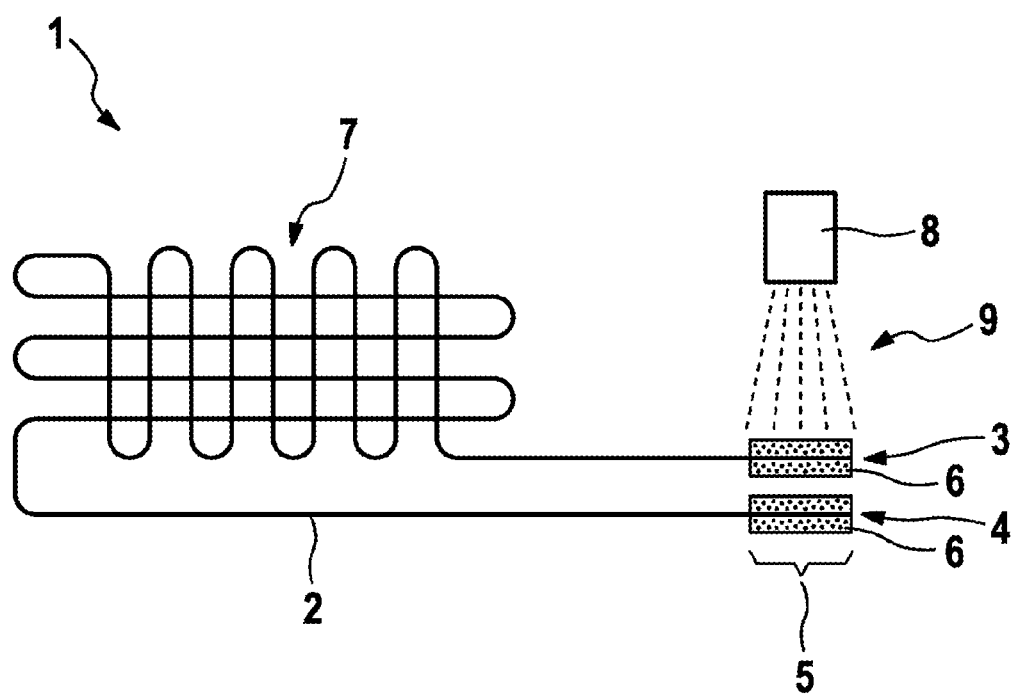
FIG. 1 is a schematic diagram of an electrical conductor according to one exemplary embodiment of the invention.

FIG. 1 shows schematically an electrical conductor 1 according to one exemplary embodiment of the invention. The electrical conductor 1 comprises an electrically conductive material 2 which comprises graphene and/or carbon nanotubes. Formed on the electrical conductor 1 are joints 3, 4 at which the electrical conductor 1 can be connected cohesively to other metallic electrical conductor elements. More particularly the joints 3, 4 allow the electrical conductor 1 to be soldered. In the exemplary embodiment shown, the joints 3, 4 are a first end 3 and a second end 4, it being possible for joints 3, 4 also to be formed at any other point of the electrical conductor 1. The electrical conductor 1 is configured preferably as a coil winding 7 for a rotor 12 or stator 11 of an electrical machine 10 (cf. FIG. 2).

As a result of the electrical conductor 1 being produced from the materials stated above, the electrical conductor 1 is ideally suitable for use as a coil winding 7 for electrical machines 10. However, the electrically conductive material 2 comprising graphene and/or carbon nanotubes has poor capacity for electrical contacting, especially soldering. At the joints 3, 4, i.e., at the first end 3 and at the second end 4, therefore, a metallic coating 6 is provided. The metallic coating 6 is applied on the electrically conductive material 2 and is in direct contact with said material.

The metallic coating 6 is applied by means of thermal spraying and more particularly by means of plasma spraying. For this purpose a plasma emitter 8 is provided which directs a plasma jet 9 onto predefined subregions 5 of the electrically conductive material 2 in order to form the joints 3, 4. Metal powder is jetted into the plasma jet, and melts before it impinges on the surface of the predefined subregion 5. The formation of the joints 3, 5, i.e., the coating of the subregion 5 at the first end 3 and of the subregion 5 at the second end 4, may take place simultaneously or in succession.

The plasma spraying enables the application of titanium and/or zirconium and/or iron and/or vanadium and/or niobium and/or molybdenum and/or hafnium and/or tantalum and/or tungsten to the electrical conductor 2. These materials form carbides with the carbon of the electrically conductive material 2. These carbides in turn have a low electrical resistance. Accordingly a boundary layer of the coating 6 is formed at which the metal of the coating 6 reacts with the carbon of the electrically conductive material 2 and forms said carbides. By means of a metallic coating 6 of this kind, therefore, an optimal electrical contacting of the electrical conductor 1 can take place, and more particularly the electrical conductor 1 can be soldered to other components via the coatings 6. This may be done advantageously using customary, standard solder; there is in particular no need to use specially adapted solders.

At the start of the coating operation, preferably, an inert gas needed for the plasma coating is admixed with nitrogen. The metals used for the coating therefore form nitrides, which have a higher electrical conductivity than the corresponding carbides of the metals used. The effect of adding nitrogen only at the start of the coating operation is that nitrides are formed only where the coating 6 is in direct contact with the electrical conductor 2, i.e., at the boundary layer of the coating. The addition of nitrogen is advantageous for the coating with titanium and/or zirconium and/or hafnium.

Figure 2:
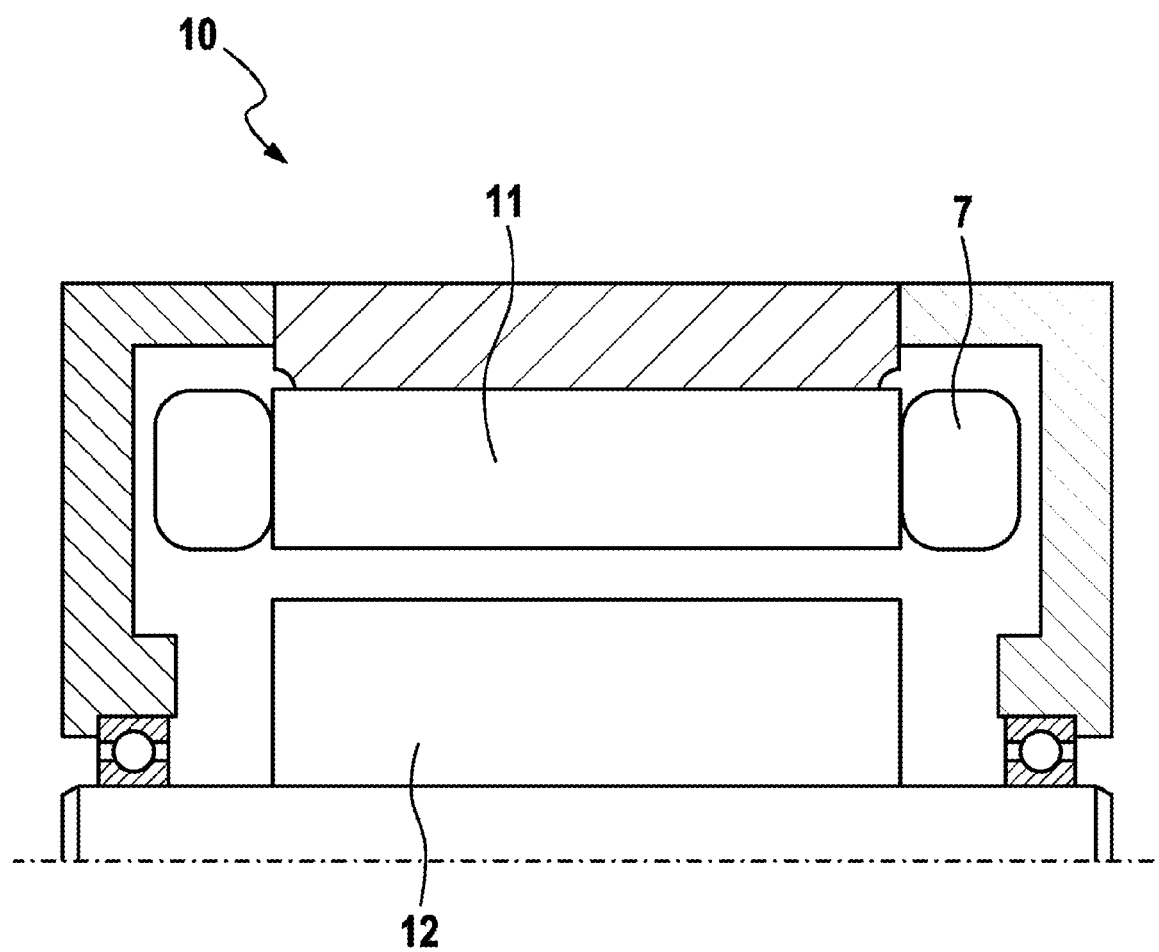
FIG. 2 is a schematic diagram of an electrical machine according to one exemplary embodiment of the invention.

As already described, the electrical conductor 1 is ideally suited for windings of electrical machines 10. An electrical machine 10 according to one exemplary embodiment of the invention is shown in FIG. 2. This electrical machine 10 has a stator 11 and a rotor 12, with the coil winding 7 of the electrical conductor 1 being more particularly a winding of the stator 11. By virtue of the textile qualities of the electrically conductive material 2, this winding can be produced simply and at low cost and complexity, and is also robust toward external influences. Moreover, because of the metallic coating 6, the electrical conductor 1 can be connected cohesively to other metallic electrically conductive components simply and with little cost and complexity, so simplifying the assembly of the electrical machine 10. The cohesive connection is more particularly a soldered connection and hence a low-resistance electrical contacting.

What is claimed is:

1. An electrical conductor comprising an electrically conductive material comprising graphene and/or carbon nanotubes and a joint, the electrically conductive material of the electrical conductor having thereon, at the joint, a metallic coating configured to cohesively connect the electrical conductor to a metallic conductor element, the metallic coating being in direct contact with the electrically conductive material, wherein the metallic coating of the joint a metal which forms carbides in a boundary layer of the coating through reaction of the metal of the metallic coating with the carbon of the electrically conductive material, wherein the metallic coating comprises titanium and/or zirconium and/or iron and/or vanadium and/or niobium and/or molybdenum and/or hafnium and/or tantalum and/or tungsten, wherein nitrides are formed in the boundary layer of the metallic coating, and wherein the metallic coating is a plasma coating.

2. An electrical machine comprising a coil winding formed of an electrical conductor as claimed in claim 1.

3. A method for producing an electrical conductor, comprising the steps of:

providing an electrically conductive material comprising graphene and/or carbon nanotubes, and forming a joint of the electrical conductor by coating a predefined subregion of the electrically conductive material with a metallic coating, where the metallic coating comprises a metal which forms carbides in a boundary layer of the coating through reaction of the metal with the carbon of the electrically conductive material, wherein the coating takes place with titanium and/or zirconium and/or iron and/or vanadium and/or niobium and/or molybdenum and/or hafnium and/or tantalum and/or tungsten, wherein the coating is done by plasma spraying, and wherein nitrogen is added to an inert gas used for the plasma spraying, in order to enable formation of nitrides in the metallic coating.

4. The method as claimed in claim 3, wherein the nitrogen is added to the inert gas at the start of the plasma spraying and is no longer added to the inert gas after a predefined period has expired.

5. An electrical machine comprising a coil winding formed of an electrical conductor as claimed in claim 1, where the coil winding is a winding of a rotor or stator of the electrical machine.

6. The electrical conductor as claimed in claim 1, wherein the metallic coating comprises titanium.

7. The electrical conductor as claimed in claim 1, wherein the metallic coating comprises zirconium.

8. The electrical conductor as claimed in claim 1, wherein the metallic coating comprises iron.

9. The electrical conductor as claimed in claim 1, wherein the metallic coating comprises vanadium.

10. The electrical conductor as claimed in claim 1, wherein the metallic coating comprises niobium.

11. The electrical conductor as claimed in claim 1, wherein the metallic coating comprises molybdenum.

12. The electrical conductor as claimed in claim 1, wherein the metallic coating comprises hafnium.

13. The electrical conductor as claimed in claim 1, wherein the metallic coating comprises tantalum.

14. The electrical conductor as claimed in claim 1, wherein the metallic coating comprises tungsten.

* * * * *